(12) United States Patent
Gillespie

(10) Patent No.: US 11,905,093 B2
(45) Date of Patent: Feb. 20, 2024

(54) PEELABLE FILM FOR CONTAINER LID

(71) Applicant: Berry Plastics Corporation, Evansville, IN (US)

(72) Inventor: Bryan Gillespie, Altoona, WI (US)

(73) Assignee: Berry Plastics Corporation, Evansville, IN (US)

( * ) Notice: Subject to any disclaimer, the term of this patent is extended or adjusted under 35 U.S.C. 154(b) by 751 days.

(21) Appl. No.: 15/367,556

(22) Filed: Dec. 2, 2016

(65) Prior Publication Data

US 2017/0158404 A1    Jun. 8, 2017

Related U.S. Application Data

(60) Provisional application No. 62/261,950, filed on Dec. 2, 2015.

(51) Int. Cl.
| | | |
|---|---|---|
| *B65D 77/20* | (2006.01) | |
| *B32B 27/34* | (2006.01) | |
| *B32B 27/28* | (2006.01) | |
| *B32B 15/20* | (2006.01) | |
| *B32B 15/085* | (2006.01) | |
| *B32B 7/12* | (2006.01) | |
| *B32B 27/18* | (2006.01) | |

(Continued)

(52) U.S. Cl.
CPC ............ *B65D 77/2032* (2013.01); *B32B 7/12* (2013.01); *B32B 15/085* (2013.01); *B32B 15/20* (2013.01); *B32B 27/08* (2013.01); *B32B 27/18* (2013.01); *B32B 27/285* (2013.01); *B32B 27/308* (2013.01); *B32B 27/32* (2013.01); *B32B 27/34* (2013.01); *B32B 27/36* (2013.01); *B65D 65/00* (2013.01); *B32B 2250/03* (2013.01); *B32B 2250/04* (2013.01); *B32B 2270/00* (2013.01); *B32B 2274/00* (2013.01); *B32B 2307/306* (2013.01); *B32B 2307/31* (2013.01); *B32B 2307/50* (2013.01); *B32B 2307/518* (2013.01); *B32B 2307/54* (2013.01); *B32B 2307/72* (2013.01); *B32B 2307/732* (2013.01); *B32B 2307/746* (2013.01); *B32B 2307/748* (2013.01); *B32B 2307/75* (2013.01); *B32B 2435/02* (2013.01); *B65D 2577/205* (2013.01)

(58) Field of Classification Search
CPC ..... B29C 47/065; B29C 53/14; B65D 77/032; B65D 65/00; B32B 27/08; B32B 27/308; B32B 27/32; B32B 27/36
USPC ...................................... 428/35.7, 35.2, 483
See application file for complete search history.

(56) References Cited

U.S. PATENT DOCUMENTS

| | | |
|---|---|---|
| 3,927,244 A | 12/1975 | Ogura |
| 4,643,926 A | 2/1987 | Mueller |

(Continued)

FOREIGN PATENT DOCUMENTS

| | | |
|---|---|---|
| EP | 216639 B1 | 4/1987 |
| EP | 293603 B1 | 12/1988 |

(Continued)

OTHER PUBLICATIONS

Chemical Resistance of Plastics and Elastomers (Year: 2008).*

(Continued)

*Primary Examiner* — Michael C Miggins
(74) *Attorney, Agent, or Firm* — Barnes & Thornburg LLP

(57) ABSTRACT

A multi-layer film includes a skin layer, a core layer, and a seal layer. The multi-layer film may be used as a closure for a food container.

17 Claims, 3 Drawing Sheets

(51) Int. Cl.
  *B32B 27/08* (2006.01)
  *B32B 27/30* (2006.01)
  *B32B 27/32* (2006.01)
  *B32B 27/36* (2006.01)
  *B65D 65/00* (2006.01)

(56) References Cited

U.S. PATENT DOCUMENTS

| | | | |
|---|---|---|---|
| 4,729,476 | A | 3/1988 | Lulham |
| 4,769,273 | A | 9/1988 | Hoeschele |
| 4,968,464 | A | 11/1990 | Kojoh |
| 5,091,497 | A | 2/1992 | Grogler |
| 5,204,181 | A | 4/1993 | Suzuki |
| 5,270,390 | A | 12/1993 | Shibuya |
| 5,789,046 | A | 8/1998 | Mueller |
| 5,846,642 | A | 12/1998 | Kimura |
| 5,939,183 | A | 8/1999 | Kuratsuji |
| 5,972,443 | A * | 10/1999 | Breck ............... C08L 23/0815 156/203 |
| 6,027,776 | A | 2/2000 | Mueller |
| 6,183,863 | B1 | 2/2001 | Kawachi |
| 6,656,601 | B1 | 12/2003 | Kawachi |
| 7,261,935 | B2 | 8/2007 | Hofmann |
| 7,619,132 | B2 | 11/2009 | Topolkaraev |
| 7,638,202 | B2 | 12/2009 | Nanba |
| 7,863,758 | B2 | 1/2011 | Jung |
| 7,914,867 | B2 | 3/2011 | Mori |
| 8,071,695 | B2 | 12/2011 | Strand |
| 8,592,016 | B2 | 11/2013 | Schmal |
| 8,691,394 | B2 | 4/2014 | Maruichi |
| 8,697,211 | B2 | 4/2014 | Gkinosatis |
| 8,945,704 | B2 | 2/2015 | Shibata |
| 8,999,466 | B2 | 4/2015 | Uehara |
| 2001/0031371 | A1 | 10/2001 | Kong |
| 2002/0122933 | A1 | 9/2002 | Takahata |
| 2003/0021925 | A1 * | 1/2003 | Schmal ............... B29C 47/065 428/35.7 |
| 2004/0121172 | A1 | 6/2004 | Hofmann |
| 2005/0000965 | A1 | 1/2005 | Boardman |
| 2005/0079372 | A1 | 4/2005 | Schmal |
| 2006/0111519 | A1 | 5/2006 | Strand |
| 2006/0149200 | A1 | 7/2006 | Topolkaraev |
| 2007/0052131 | A1 | 3/2007 | Fujimaki |
| 2007/0065673 | A1 | 3/2007 | Nanba |
| 2007/0128427 | A1 | 6/2007 | Suzuki |
| 2008/0260917 | A1 | 10/2008 | Sankey |
| 2009/0029159 | A1 | 1/2009 | Guo |
| 2009/0202851 | A1 | 8/2009 | Maruichi |
| 2009/0275251 | A1 | 11/2009 | Bonnet |
| 2010/0034939 | A1 | 2/2010 | Gkinosatis |
| 2011/0197427 | A1 | 8/2011 | Weber |
| 2011/0200770 | A1 | 8/2011 | Uehara |
| 2012/0175555 | A1 | 7/2012 | Menozzi |
| 2012/0225227 | A1 | 9/2012 | Radosta |
| 2012/0328865 | A1 | 12/2012 | Riedl |
| 2013/0129990 | A1 | 5/2013 | Shibata |
| 2013/0295382 | A1 | 11/2013 | Yuki |
| 2014/0120281 | A1 | 5/2014 | Iwasaki |
| 2014/0162077 | A1 | 6/2014 | Maruichi |
| 2014/0220369 | A1 | 8/2014 | Ishikawa |
| 2014/0238570 | A1 | 8/2014 | Shimizu |
| 2014/0263342 | A1 | 9/2014 | Gillespie |
| 2015/0018489 | A1 | 1/2015 | Shiraishi |

FOREIGN PATENT DOCUMENTS

| | | |
|---|---|---|
| EP | 322778 B1 | 7/1989 |
| EP | 468768 A1 | 1/1992 |
| EP | 688813 B1 | 12/1995 |
| EP | 733472 B2 | 9/1996 |
| EP | 791620 A3 | 8/1997 |
| EP | 1115947 A2 | 7/2001 |
| EP | 1561574 B1 | 8/2005 |
| EP | 1587678 A1 | 10/2005 |
| EP | 1745216 A2 | 1/2007 |
| EP | 1767348 B1 | 3/2007 |
| EP | 1803552 B1 | 7/2007 |
| EP | 1809702 B1 | 7/2007 |
| EP | 1838526 B1 | 10/2007 |
| EP | 1846240 B1 | 10/2007 |
| EP | 1928939 A1 | 6/2008 |
| EP | 1940904 B1 | 7/2008 |
| EP | 1979162 A2 | 10/2008 |
| EP | 2039507 A1 | 3/2009 |
| EP | 2340934 B1 | 7/2011 |
| EP | 2467420 B1 | 6/2012 |
| EP | 2539148 B1 | 1/2013 |
| EP | 2602108 A1 | 6/2013 |
| EP | 2666632 A1 | 11/2013 |
| EP | 2732972 A1 | 5/2014 |
| EP | 2832775 A1 | 2/2015 |
| JP | 2007320571 * | 12/2007 |
| WO | 0015905 | 3/2000 |
| WO | 2004058499 A1 | 7/2004 |
| WO | 2005111436 A2 | 11/2005 |
| WO | 2007040937 A1 | 4/2007 |
| WO | 2007085769 A2 | 8/2007 |

OTHER PUBLICATIONS

Troughton, Michael J., Handbook of Plastics Joining: A Practical Guide. 2008, Second Edition, p. 521 (Year: 2008).*
International Search Report and Written Opinion for International (PCT) Application No. PCT/US2016/064700 dated Feb. 8, 2017, 10 pages.

* cited by examiner

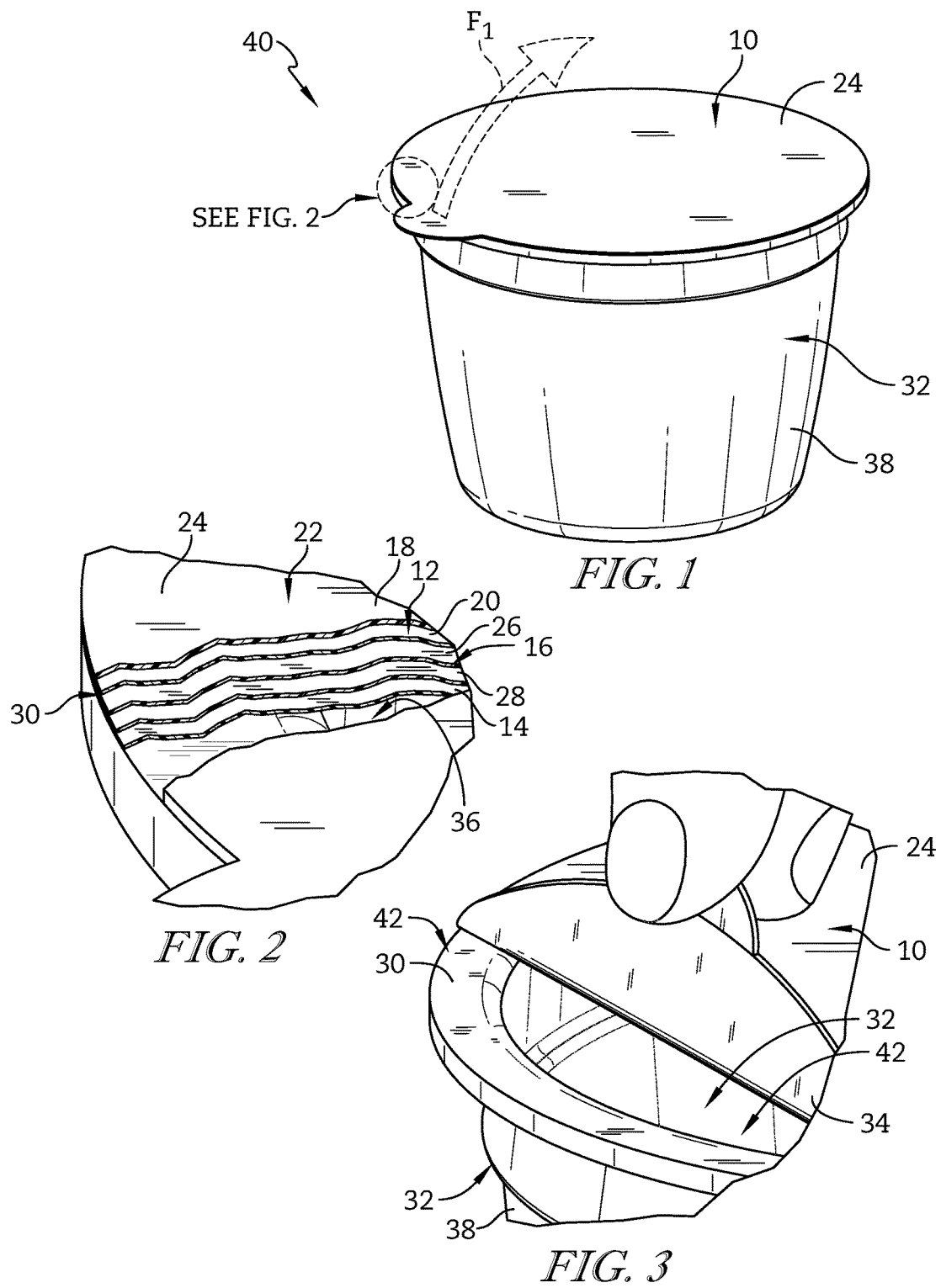

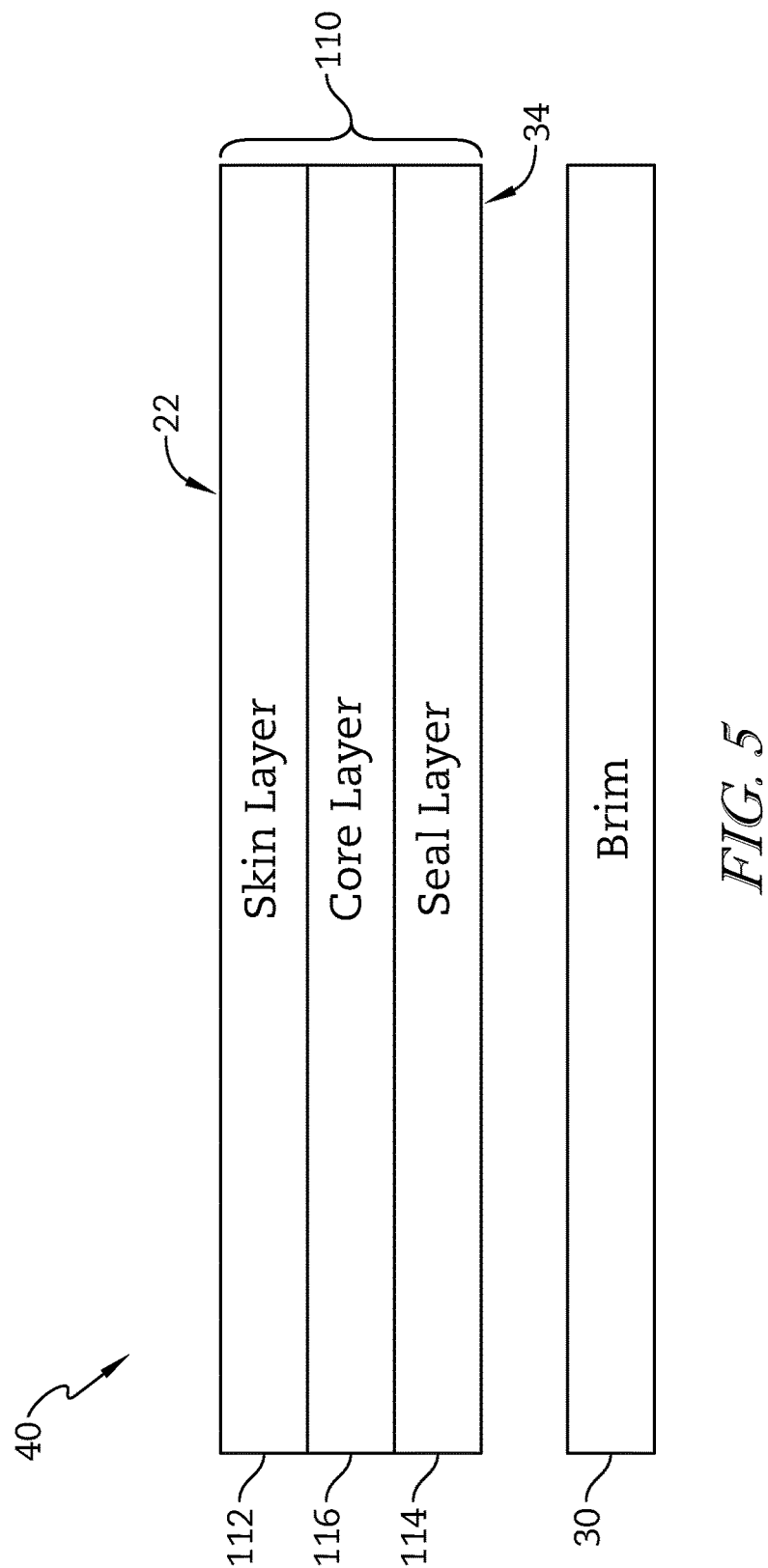

PEELABLE FILM FOR CONTAINER LID

CROSS REFERENCE TO RELATED APPLICATIONS

This application claims priority under 35 U.S.C. § 119(e) to U.S. Provisional Patent Application No. 62/261,950, filed Dec. 2, 2015, which is expressly incorporated by reference herein.

BACKGROUND

The present disclosure relates to multi-layer films, and particularly to multi-layer films included as a closure for a container. More particularly, the present disclosure relates to multi-layer films and containers made from plastics materials.

SUMMARY

According to the present disclosure, a multi-layer film is used to form a closure for a container. The multi-layer film includes a core layer and a skin layer. The skin layer is arranged to define an exterior surface for the closure of the container. The core layer is located between the skin layer and a brim of the container.

In illustrative embodiments, the multi-layer film further includes a seal layer comprised of a thermoplastic elastomer material. The seal layer is arranged to locate the core layer between the skin layer and the seal layer. The seal layer is configured to bond temporarily to the brim of the container to establish a hermetic seal that survives a pasteurization process and peels away from the brim after a pasteurization process to expose the mouth without leaving any portion of the multi-layer film behind coupled to the brim when a user applies a peel force to the multi-layer film.

In illustrative embodiments, the skin layer includes a first skin sub-layer comprising a PET material and a second skin sub-layer comprising an adhesive. The second skin sub-layer extends between and interconnects the first skin sub-layer with the core layer. The first skin sub-layer forms the exterior surface of the closure when the multi-layer film is used to seal a container.

In illustrative embodiments, the core layer includes a first core sub-layer comprising a polyethylene material and a second core sub-layer comprising a polyethylene copolymer material. The second core sub-layer extends between and interconnects the first core sub-layer with the seal layer.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a first embodiment of a package in accordance with the present disclosure showing that the package includes a container and a closure made from a multi-layer film;

FIG. 2 is an enlarged partial perspective view taken from the circled area of FIG. 1 with portions broken away to reveal that the multi-layer film of the closure includes, from outside to inside, a skin layer, a core layer, and a seal layer;

FIG. 3 is an enlarged partial perspective view of the package of FIG. 1 after a consumer has applied a peel force to the closure to cause the closure to peel away cleanly from a brim included in the container;

Figure 4:
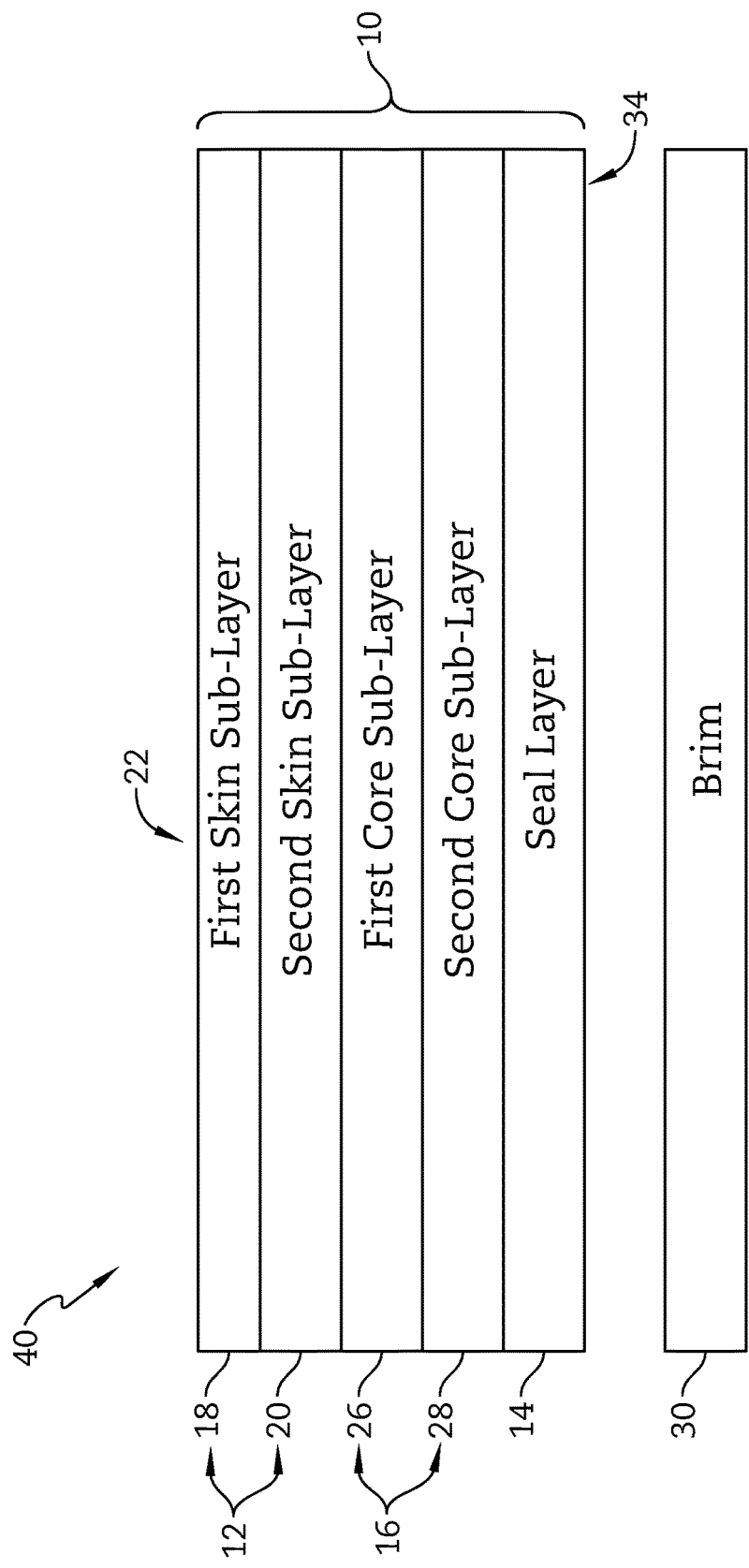

FIG. 4 is a diagrammatic view of the package of FIGS. 1-3 showing that the multi-layer film includes, from top to bottom, a first skin sub-layer, a second skin sub-layer, a first core sub-layer, a second core sub-layer, and a seal layer; and FIG. 5 is a diagrammatic view of a second embodiment of a multi-layer film in accordance with the present disclosure showing that the multi-layer film includes a skin layer, a core layer, and a seal layer.

DETAILED DESCRIPTION

A package 40 in accordance with the present disclosure includes a container 32 and a closure 24 as shown in FIGS. 1-4. Closure 24 is coupled to container 32 to block selectively access to products stored in an interior product-storage region 36 through a mouth 42. Closure 24 is made from a multi-layer film 10 in accordance with the present disclosure. A first embodiment of multi-layer film 10 is shown in FIGS. 2 and 4. A second embodiment of a multi-layer film 110 is shown in FIG. 5. Multi-layer films 10, 110 are configured to bond temporarily to a brim 30 of container 32 to establish a hermetic seal with brim 30 that survives a pasteurization process and peels away from container 32 to expose mouth 42 without leaving any portion of multi-layer films 10, 110 behind on brim 30 when a user applies a peel force $F_1$ to closure 24 as suggested in FIG. 1 and shown in FIG. 3.

Multi-layer film 10 includes a skin layer 12, a seal layer 14, and a core layer 16 as shown in FIGS. 2 and 4. Core layer 16 is configured to extend between and interconnect skin layer 12 and seal layer 14. Seal layer 14 is configured to couple selectively multi-layer film 10 to brim 30 of container 32. In one example, seal layer 14 comprises a thermoplastic elastomer and is configured to bond temporarily to container 32 so as to peel away cleanly from brim 30 and leave behind no residue or portion of multi-layer film 10 when removed.

Package 40 includes container 32 and closure 24 as shown in FIG. 1. Container 32 may be used to hold a food product or other suitable product in interior product-storage region 36 formed in container 32. Closure 24 cooperates to form a hermetic seal with brim 30 of container 32 and blocks selectively access to interior product-storage region 36. Package 40 may be used in a high-pressure, cold-pasteurization technique, for example, High-Pressure Processing (HPP), to preserve food product stored in package 40. Generally, for HPP, a sealed products-containing package is subjected to a water-mediated high level of isostatic pressure (300-600 MPa/43,500-87,000 psi) for content pasteurization.

Container 32 includes a bowl 38 formed to include interior product-storage region 36 and brim 30 as shown in FIGS. 1-3. In one example, brim 30 is a continuous, uninterrupted ring that surrounds circumferentially and defines a mouth 42 which is arranged to open into interior product-storage region 36. In one example, container 32 comprises a polyethylene terephthalate (PET) material.

Closure 24 is formed from multi-layer film 10 as shown in FIGS. 2 and 4. Multi-layer film 10 is, for example, a cast co-extruded and laminated film and includes skin layer 12, seal layer 14, and core layer 16. Closure 24 blocks access to interior product-storage region 36 until closure 24 is removed by a consumer. Closure 24 is configured to seal to PET containers 32 with good caulkability and form a high integrity seal with brim 30.

In one illustrative example, multi-layer film 10 is a cast co-extruded film in which seal layer 14 and core layer 16 each comprise a formulation. Illustratively, each formulation of seal layer 14 or core layer 16 is added to a hopper on an extrusion machine and heated to produce a molten material in the extruder. The molten material of each of seal layer 14 and core layer 16 is cast co-extruded. Skin layer 12 may then be laminated to core layer 16 to produce multi-layer film 10. However, multi-layer film 10 may be made using any suitable process including air or water quench blown film, extrusion coating, extrusion laminating, or adhesive laminating.

Seal layer 14 is configured to bond temporarily to brim 30 of container 32 and seal closure 24 to container 32 as shown in FIGS. 1-3. When closure 24 is coupled to brim 30, seal layer 14 forms the interior surface 34 of closure 24 as shown in FIGS. 1-3. In some embodiments, seal layer 14 comprises a PET-based elastomer configured to maximize peel consistency by minimizing formation of stringers during peeling of closure 24 away from container 32. A stringer is a portion of the seal layer which delaminates from multi-layer film 10. In one example, the stringer remains coupled to the container 32 providing an unattractive appearance.

Core layer 16 is located between seal layer 14 and skin layer 12, as shown in FIGS. 2 and 4. Core layer 16 includes a first core sub-layer 26 and a second core sub-layer 28. First core sub-layer 26 is located between skin layer 12 and second core sub-layer 28. Second core sub-layer 28 is located between first skin sub-layer 18 and seal layer 14. Illustratively, second core sub-layer 28 functions as an adhesive layer and to provide structural integrity to multi-layer film 10.

Skin layer 12 forms the exterior surface 22 of closure 24. Skin layer 12 includes a first skin sub-layer 18 and a second skin sub-layer 20. In some embodiments, first skin sub-layer 18 comprises a printable PET material. Second skin sublayer 20 is arranged to extend between and interconnect first skin sub-layer 18 and core layer 16.

In an embodiment, multi-layer film 10 is about 1 mil to about 3 mils thick. Multi-layer film 10 may be a particular thickness or fall within one of several different ranges. The thickness of multi-layer film 10 may be one of the following values: about 1 mil, about 1.1 mils, about 1.2 mils, about 1.3 mils, about 1.4 mils, about 1.5 mils, about 1.6 mils, about 1.7 mils, about 1.8 mils, about 1.9 mils, about 2 mils, about 2.1 mils, about 2.2 mils, about 2.3 mils, about 2.4 mils, about 2.5 mils, about 2.6 mils, about 2.7 mils, about 2.8 mils, and about 3.0 mils. The thickness of multi-layer film 10 may fall within one of many different ranges. In a set of ranges, the thickness of multi-layer film 10 is one of the following ranges: about 1 mil to about 3 mils, about 1.5 mils to about 3 mils, about 1.7 mils to about 3 mils, about 1.7 mils to about 2.7 mils, about 1.8 mils to about 2.6 mils, and about 1.9 mils to about 2.6 mils. In an embodiment, multi-layer film 10 is about 2.5 mils thick.

In an embodiment, multi-layer film 10 has a density of about 0.8 g/cm$^3$ to about 1.1 g/cm$^3$. Multi-layer film 10 may have a particular density or fall within one of several different ranges. The density of multi-layer film 10 may be one of the following values: about 0.8 g/cm$^3$, about 0.85 g/cm$^3$, about 0.9 g/cm$^3$, about 0.91 g/cm$^3$, about 0.92 g/cm$^3$, about 0.93 g/cm$^3$, about 0.94 g/cm$^3$, about 0.95 g/cm$^3$, about 0.96 g/cm$^3$, about 0.97 g/cm$^3$, about 0.98 g/cm$^3$, about 0.99 g/cm$^3$, about 1 g/cm$^3$, and about 1.1 g/cm$^3$. The density of multi-layer film 10 may fall within one of many different ranges. In a set of ranges, the density of multi-layer film 10 is one of the following ranges: about 0.8 g/cm$^3$ to about 1.1 g/cm$^3$, about 0.85 g/cm$^3$ to about 1.1 g/cm$^3$, about 0.85 g/cm$^3$ to about 1 g/cm$^3$, about 0.9 g/cm$^3$ to about 1 g/cm$^3$, and about 0.95 g/cm$^3$ to about 1 g/cm$^3$. In an example, multi-layer film has a density of about 0.96 g/cm$^3$. In an example, multi-layer film has a density of about 0.97 g/cm$^3$.

Skin layer 12 includes first skin sub-layer 18 and a second skin sub-layer 20 as shown in FIGS. 2 and 4. Skin layer 12 is laminated to core layer 16 to produce multi-layer film 10. First skin sub-layer 18 forms exterior surface 22 of closure 24 when multi-layer film 10 is bonded to container 32. Second skin sub-layer 20 is arranged to extend between and interconnect first skin sub-layer 18 and core layer 16. Illustratively, skin layer 12 is configured to provide heat resistance and printability for multi-layer film 10.

In an embodiment, skin layer 12 is about 10% to about 40% of an overall thickness of multi-layer film 10. Skin layer 12 may be one of several different percentages of thickness of multi-layer film 10 or fall within one of several different ranges. The percentage of thickness of skin layer 12 may be one of the following values: about 10%, about 15%, about 20%, about 25%, about 35%, and about 40% of the total thickness of multi-layer film 10. The thickness of skin layer 12 of multi-layer film 10 may fall within one of many different ranges. In a set of ranges, the thickness of skin layer 12 is one of the following ranges: about 10% to about 40%, about 10% to about 35%, about 10% to about 30%, about 15% to about 30%, and about 15% to about 25% of the total thickness of multi-layer film 10. In an embodiment, skin layer 12 is about 20% of the total thickness of multi-layer film 10.

In an embodiment, skin layer 12 is about 0.3 mils to about 1.5 mils thick. Skin layer 12 may be a particular thickness or fall within one of several different ranges. The thickness of skin layer 12 may be one of the following values: about 0.3 mils, about 0.4 mils, about 0.5 mils, about 0.6 mils, about 0.7 mils, about 0.8 mils, about 0.9 mils, about 1 mil, about 1.1 mils, about 1.2 mils, about 1.3 mils, about 1.4 mils, and about 1.5 mils. The thickness of skin layer 12 may fall within one of many different ranges. In a set of ranges, the thickness of skin layer 12 is one of the following ranges: about 0.3 mils to about 1.5 mils, about 0.3 mils to about 1.3 mils, about 0.3 mils to about 1.1 mils, and about 0.3 mils to about 0.9 mils.

First skin sub-layer 18 forms exterior surface 22 when closure 24 comprises multi-layer film 10, as shown in FIGS. 2 and 4. First skin sub-layer 18 is coupled to second skin sub-layer 20. Illustratively, first skin sub-layer 18 can provide a printable surface for closure 24.

In an embodiment, first skin sub-layer 18 is about 10% to about 35% of the total thickness of multi-layer film 10. First skin sub-layer 18 may be one of several different percentages of the total thickness of multi-layer film 10 or fall within one of several different ranges. The percentage thickness of first skin sub-layer 18 of multi-layer film 10 may be one of the following values: about 10%, about 15%, about 17%, about 18%, about 19%, about 20%, about 21%, about 22%, about 25%, about 30%, and about 35% of the total thickness of multi-layer film 10. It is within of the scope present disclosure for the thickness of first skin sub-layer 18 to fall within one of many different ranges. In a set of ranges, the thickness range of first skin sub-layer 18 is one of the following ranges: about 10% to about 35%, about 10% to about 30%, about 10% to about 25%, about 15% to about 25%, and about 15% to about 22% of the total thickness multi-layer film 10. In an example, first skin sub-layer 18 may be about 19% of the total thickness of multi-layer film 10.

In an embodiment, first skin sub-layer 18 is about 0.3 mils to about 1.5 mils thick. First skin sub-layer 18 may be a particular thickness or fall within one of several different ranges. The thickness of first skin sub-layer 18 may be one of the following values: about 0.3 mils, about 0.4 mils, about 0.5 mils, about 0.6 mils, about 0.7 mils, about 0.8 mils, about 0.9 mils, about 1 mil, about 1.1 mils, about 1.2 mils, about 1.3 mils, about 1.4 mils, and about 1.5 mils. The thickness of first skin sub-layer 18 may fall within one of many different ranges. In a set of ranges, the thickness of first skin sub-layer 18 is one of the following ranges: about 0.3 mils to about 1.5 mils, about 0.3 mils to about 1.3 mils, about 0.3 mils to about 1.1 mils, and about 0.3 mils to about 0.9 mils.

In an embodiment, first skin sub-layer 18 comprises an oriented PET (OPET) material. In another embodiment, first skin sub-layer 18 comprises bi-axially oriented PET (BO-PET). In another embodiment, first skin sub-layer 18 comprises bi-axially oriented polypropylene (BOPP). In another embodiment, first skin sub-layer 18 comprises biaxially oriented polyamide (BOPA). In another embodiment, first skin sub-layer 18 comprises biaxially oriented nylon (BON). In another embodiment, first skin sub-layer 18 comprises an aluminum foil. In an exemplary embodiment, first skin sub-layer 18 comprises Toray Lumirror® PA10.

Second skin sub-layer 20 extends between and interconnects first skin sub-layer 18 and core layer 16, as shown in FIGS. 2 and 4. Illustratively, second skin sub-layer 20 is tie-layer or an adhesive layer for laminating skin layer 12 to core layer 16.

In an embodiment, second skin sub-layer 20 is about 0.5% to about 1.5% of the total thickness of multi-layer film 10. Second skin sub-layer 20 may be one of several different percentages of the total thickness of multi-layer film 10 or fall within one of several different ranges. The percentage thickness of second skin sub-layer 20 of multi-layer film 10 may be one of the following values: about 0.5%, about 0.6%, about 0.7%, about 0.8%, about 0.9%, about 1%, about 1.2%, and about 1.5% of the total thickness of multi-layer film 10. It is within the present disclosure for the thickness of second skin sub-layer 20 to fall within one of many different ranges. In a set of ranges, the thickness range of second skin sub-layer 20 is one of the following ranges: about 0.5% to about 1.5%, about 0.7% to about 1.5%, about 0.7% to about 1.3%, and about 0.7% to about 1.2% of the total thickness multi-layer film 10. In an example, second skin sub-layer 20 may be about 1% of the total thickness of multi-layer film 10. In another example, second skin sub-layer 20 is about 0.7 to 1.4 lbs/ream.

In an embodiment, second skin sub-layer 20 comprises a laminating adhesive material. Illustratively, second skin sub-layer 20 comprises a polyester polyurethane based adhesive. In an exemplary embodiment, the second skin sub-layer 20 comprises MOR-FREE™ L75-164 C/C-411 available from The Dow Chemical Company™.

Core layer 16 includes a first core sub-layer 26 and a second core sub-layer 28 as shown in FIGS. 2 and 4. First core sub-layer 26 is configured to extend between and interconnect second core sub-layer 28 and skin layer 12. Second core sub-layer 28 is arranged to extend between and interconnect first core sub-layer 26 and seal layer 14.

In an embodiment, core layer 16 is about 40% to about 80% of the overall thickness of multi-layer film 10. Core layer 16 may be one of several different percentages of the thickness of multi-layer film 10 or fall within one of several different ranges. The percentage of thickness of core layer 16 may be one of the following values: about 40%, about 45%, about 50%, about 55%, about 60%, about 62%, about 63%, about 64%, about 65%, about 66%, about 70%, and about 80% of the total thickness of multi-layer film 10. The thickness of core layer 16 of multi-layer film 10 may fall within one of many different ranges. In a set of ranges, the thickness of core layer 16 is one of the following ranges: about 40% to about 80%, about 50% to about 80%, about 50% to about 75%, about 55% to about 75%, and about 60% to about 75% of the total thickness of multi-layer film 10. In an embodiment, core layer 16 is about 64% of the total thickness of multi-layer film 10.

In an embodiment, core layer 16 is about 1 mil to about 2.5 mils thick. Core layer 16 may be a particular thickness or fall within one of several different ranges. The thickness of core layer 16 may be one of the following values: about 1 mil, about 1.2 mils, about 1.4 mils, about 1.5 mils, about 1.6 mils, about 1.7 mils, about 1.8 mils, about 1.9 mils, about 2 mils, about 2.2 mils, about 2.4 mils, and about 2.5 mils. The thickness of core layer 16 may fall within one of many different ranges. In a set of ranges, the thickness of core layer 16 is one of the following ranges: about 1 mil to about 2.5 mils, about 1.2 mils to about 2.5 mils, about 1.2 mils to about 2.3 mils, about 1.2 mils to about 2 mils, and about 1.5 mils to about 2 mils. In an embodiment, core layer 16 is about 1.6 mils thick.

First core sub-layer 26 extends between and interconnects second core sub-layer 28 and skin layer 12, as shown in FIGS. 2 and 4. Illustratively, first core sub-layer 26 is can provide stiffness to multi-layer film 10.

In an embodiment, first core sub-layer 26 is about 30% to about 60% of the total thickness of multi-layer film 10. First core sub-layer 26 may be one of several different percentages of the total thickness of multi-layer film 10 or fall within one of several different ranges. The percentage thickness of first core sub-layer 26 of multi-layer film 10 may be one of the following values: about 30%, about 35%, about 40%, about 45%, about 46%, about 47%, about 48%, about 49%, about 50%, about 55%, and about 60% of the total thickness of multi-layer film 10. It is within the present disclosure for the thickness of first core sub-layer 26 to fall within one of many different ranges. In a set of ranges, the thickness range of first core sub-layer 26 is one of the following ranges: about 30% to about 60%, about 35% to about 60%, about 35% to about 55%, about 40% to about 55%, and about 40% to about 50% of the total thickness multi-layer film 10. In an example, first core sub-layer 26 is about 48% of the total thickness of multi-layer film 10.

In an embodiment, first core sub-layer 26 is about 0.7 mils to about 1.6 mils thick. First core sub-layer 26 may be a particular thickness or fall within one of several different ranges. The thickness of first core sub-layer 26 may be one of the following values: about 0.7 mils, about 0.8 mils, about 0.9 mils, about 1 mil, about 1.1 mils, about 1.2 mils, about 1.3 mils, about 1.4 mils, about 1.5 mils, and about 1.6 mils. The thickness of first core sub-layer 26 may fall within one of many different ranges. In a set of ranges, the thickness of first core sub-layer 26 is one of the following ranges: about 0.7 mils to about 1.6 mils, about 0.7 mils to about 1.5 mils, about 0.9 mils to about 1.5 mils, and about 0.9 mils to about 1.4 mils. In an embodiment, first core sub-layer 26 is about 1.2 mils thick.

In an embodiment, first core sub-layer 26 comprises a polyethylene material. In some embodiments, first core sub-layer 26 comprises a linear medium-density polyethylene (LMDPE). In some embodiments, first core sub-layer 26 comprises a linear low-density polyethylene (LLDPE) material. In an embodiment, the polyethylene material comprises an ethylene-hexene copolymer (C-6). In some embodiments, the polyethylene material has a melt index of about 4.3 g/10 min. In some embodiments, the polyethylene material is ExxonMobil™ LLDPE LL 3404.48. In some embodiments, the polyethylene material has an ethylene-octene copolymer (C-8). In some embodiments, the polyethylene material has a melt index of about 6 g/10 min. In some embodiments, first core sub-layer 26 comprises Dow® DOWLEX™ 2035. Illustratively, first core sub-layer 26 comprises a formulation comprising a blend of polyethylene materials. In an embodiment, first core sub-layer 26 comprises an ethylene-hexene copolymer and an ethylene-octene copolymer material. In an embodiment, first core sub-layer 26 comprises a first polyethylene material and a second polyethylene material. Illustratively, first core sub-layer 26 comprises a blend of ExxonMobil™ LLDPE LL 3404.48 and Dow® DOWLEX™ 2035.

In some embodiments, first core sub-layer 26 comprises a first polyethylene material. In some embodiments, first core sub-layer 26 comprises a blend of an polyethylene materials. In some embodiments, first core sub-layer 26 comprises a blend of a first polyethylene material and a second polyethylene material. In some embodiments, the first polyethylene material is an ethylene-hexene copolymer material. In some embodiments, the second polyethylene material is an ethylene-octene copolymer material. In some embodiments, the first polyethylene material is ExxonMobil™ LLDPE LL 3404.4. In some embodiments, the second polyethylene material is Dow® DOWLEX™ 2035.

In certain embodiments, first core sub-layer 26 comprises a percentage of a first polyethylene material and a percentage of a second polyethylene material. First core sub-layer 26 may comprise one of several different percentages of a first polyethylene material or fall within one of several different ranges. The amount of the first polyethylene material for first core sub-layer 26 may be selected from the following values: about 20%, about 40%, about 60%, about 70%, about 75%, about 77%, about 78%, about 79%, about 80%, about 81%, about 82%, about 85%, about 90%, and about 100%. In some embodiments, first core sub-layer 26 does not comprise a first polyethylene material. In some embodiments, first core sub-layer 26 does not comprise an ethylene-hexene copolymer material. It is within the present disclosure for the percentage by weight of the first polyethylene material of first core sub-layer 26 to fall within one of many different ranges. In a set of ranges, the percentage by weight of the first polyethylene material of first core sub-layer 26 is one of the following ranges: about 0% to about 100%, about 20% to about 100%, about 40% to about 100%, about 40% to about 95%, about 40% to about 90%, about 50% to about 90%, about 60% to about 90%, and about 70% to about 90%. It should be understood that the ranges and values described herein are equally applicable when the first polyethylene material comprises an LLDPE material, an LMDPE material, or an ethylene-hexene copolymer material.

It is within the scope of the present disclosure to select an amount of the second polyethylene material for first core sub-layer 26 from the following values: about 100%, about 80%, about 60%, about 40%, about 30%, about 25%, about 23%, about 22%, about 21%, about 20%, about 19%, about 18%, about 15%, and about 10%. In some embodiments, first core sub-layer 26 does not comprise a second polyethylene material. In some embodiments, first core sub-layer 26 does not comprise an ethylene-octene copolymer material. It is within the present disclosure for the percentage by weight of the second polyethylene material of first core sub-layer 26 to fall within one of many different ranges. In a set of ranges, the percentage by weight of the second polyethylene material of first core sub-layer 26 is one of the following ranges: about 0% to about 100%, about 0% to about 80%, about 5% to about 80%, about 5% to about 60%, about 5% to about 40%, about 10% to about 40%, and about 10% to about 30%. It should be understood that the values ranges described herein are equally applicable when the second polyethylene material comprises an LLDPE material, an LMDPE material, or an ethylene-octene copolymer material.

In an embodiment described herein, first core sub-layer 26 may optionally comprise one or more additives such as slip agents or anti-block agents. In an embodiment, first core sub-layer 26 comprises an anti-block agent. In an embodiment, the anti-block agent is Polyfil Corporation ABC5000HC. In certain embodiments, the percentage by weight of the anti-block agent may fall within a set of ranges including, about 0% to about 5%, about 0.5% to about 5%, about 0.5% to about 3%, and about 1% to about 5%. In an example, first core sub-layer 26 comprises a blend of about 79% of an ethylene-hexene copolymer material, about 20% of an ethylene-octene copolymer material, and about 1% of an anti-block agent. In an example, first core sub-layer 26 comprises a blend of about 79% ExxonMobil™ LLDPE LL 3404.4, about 20% Dow® DOWLEX™ 2035, and about 1% Polyfil Corporation ABC5000HC.

Second core sub-layer 28 extends between and interconnects first core sub-layer 26 and seal layer 14, as shown in FIGS. 2 and 4. Illustratively, second core sub-layer 28 may be a tie layer and may provide stiffness to multi-layer film 10.

In an embodiment, second core sub-layer 28 is about 5% to about 40% of the total thickness of multi-layer film 10. Second core sub-layer 28 may be one of several different percentages of the total thickness of multi-layer film 10 or fall within one of several different ranges. The percentage thickness of second core sub-layer 28 of multi-layer film 10 may be one of the following values: about 5%, about 10%, about 14%, about 15%, about 16%, about 17%, about 18%, about 20%, about 25%, about 30%, and about 40% of the total thickness of multi-layer film 10. It is within the present disclosure for the thickness of second core sub-layer 28 to fall within one of many different ranges. In a set of ranges, the thickness range of second core sub-layer 28 is one of the following ranges: about 5% to about 40%, about 5% to about 35%, about 5% to about 30%, about 10% to about 25%, and about 10% to about 20% of the total thickness multi-layer film 10. In an example, second core sub-layer 28 is about 16% of the total thickness of multi-layer film 10.

In an embodiment, second core sub-layer 28 is about 0.1 mils to about 1 mil thick. Second core sub-layer 28 may be a particular thickness or fall within one of several different ranges. The thickness of second core sub-layer 28 may be one of the following values: about 0.1 mils, about 0.2 mils, about 0.3 mils, about 0.4 mils, about 0.5 mils, about 0.6 mils, about 0.8 mils, and about 1 mil. The thickness of second core sub-layer 28 may fall within one of many different ranges. In a set of ranges, the thickness of second core sub-layer 28 is one of the following ranges: about 0.1 mils to about 1 mil, about 0.2 mils to about 1 mil, about 0.2 mils to about 0.8 mils, and about 0.2 mils to about 0.6 mils. In an embodiment, second core sub-layer 28 is about 0.4 mils thick.

In an embodiment, second core sub-layer 28 comprises a polyethylene material. In another embodiment, second core sub-layer 28 comprises a polyethylene copolymer material. In some embodiments, the polyethylene material has a melt index of about 2 g/10 min. In some embodiments, the polyethylene material is an ethylene methyl acrylate copolymer material. In an illustrative embodiment, the polyethylene copolymer material is Westlake Chemical EMAC® SP2205.

In some embodiments, the methyl acrylate percentage of the ethylene methyl acrylate copolymer material may be one of several different percentages. The weight percentage of methyl acrylate of the ethylene acrylate copolymer material may be one of the following values: about 4%, about 10%, about 15%, about 16%, about 17%, about 18%, about 20%, about 21%, about 22%, about 23%, about 24%, about 25%, about 26%, about 30%, about 35%, and about 40% by weight. It is within the present disclosure for the weight percentage of methyl acrylate of the ethylene acrylate copolymer material to fall within one of many different ranges. In a set of ranges, the weight percentage of methyl acrylate of the ethylene acrylate copolymer material is one of the following ranges: about 15% to about 30%, about 15% to about 26%, about 18% to about 26%, about 18% to about 25%, and about 18% to about 24%, and about 19% to about 20% by weight. In an example, the weight percentage of methyl acrylate of the ethylene acrylate copolymer material is about 20 wt %.

Seal layer 14 forms a temporary seal with brim 30 of container 32 and can be peeled away cleanly without leaving residue or stringers attached to brim 30. Seal layer 14 comprises a low viscosity resin so closure 24 seals with the brim 30 to provide a hermetic seal. Seal layer 14 forms interior surface 34 of closure 24 and is arranged to face interior product-storage region 36 of container 32.

In an embodiment, seal layer 14 is about 5% to about 40% of the total thickness of multi-layer film 10. Seal layer 14 may be one of several different percentages of the total thickness of multi-layer film 10 or fall within one of several different ranges. The percentage thickness of seal layer 14 of multi-layer film 10 may be one of the following values: about 5%, about 10%, about 14%, about 15%, about 16%, about 17%, about 18%, about 19%, about 20%, about 30%, and about 40% of the total thickness of multi-layer film 10. It is within the present disclosure for the thickness of seal layer 14 to fall within one of many different ranges. In a set of ranges, the thickness range of seal layer 14 is one of the following ranges: about 5% to about 40%, about 5% to about 30%, about 5% to about 25%, about 10% to about 25%, about 10% to about 20%, and about 15% to about 20% of the total thickness multi-layer film 10. In an example, seal layer 14 is about 16% of the total thickness of multi-layer film 10.

In an embodiment, seal layer 14 is about 0.1 mils to about 1 mil thick. Seal layer 14 may be a particular thickness or fall within one of several different ranges. The thickness of seal layer 14 may be one of the following values: about 0.1 mils, about 0.2 mils, about 0.3 mils, about 0.4 mils, about 0.5 mils, about 0.6 mils, about 0.8 mils, and about 1 mil. The thickness of seal layer 14 may fall within one of many different ranges. In a set of ranges, the thickness of seal layer 14 is one of the following ranges: about 0.1 mils to about 1 mil, about 0.2 mils to about 1 mil, about 0.2 mils to about 0.8 mils, and about 0.2 mils to about 0.6 mils. In an embodiment, seal layer 14 is about 0.4 mils thick.

In an embodiment, seal layer 14 comprises a thermoplastic elastomer material. In some embodiments, seal layer 14 comprises a copolyester elastomer. In some embodiments, seal layer 14 comprises a polyether ester elastomer. In some embodiments, seal layer 14 comprises a thermoplastic polyester elastomer. In an exemplary embodiment, the thermoplastic elastomer comprises a block copolymer of alternating hard segments and soft segments, as described by ISO 18064. In an embodiment, the thermoplastic elastomer material is a copolyester thermoplastic elastomer (TPC) material. In some embodiments, the thermoplastic elastomer material is a TPC with a polyether soft segment (TPC-ET) according to ISO 18064.

In some embodiments, the thermoplastic elastomer material has a melt flow index of about 25 g/10 min. In some embodiments, the thermoplastic elastomer material has a melt volume-flow rate of about 35 $cm^3/10$ min as measured by ISO 1133. In some embodiments, the thermoplastic elastomer has a melt flow index selected from a range of: about 20 g/10 min to about 45 g/10 min, about 20 g/10 min to about 38 g/10 min, and about 25 g/10 min to about 35 g/10 min. In some embodiments, the thermoplastic elastomer material has a tensile modulus of about 25 MPa according to ISO 527-1/-2. In some embodiments, the thermoplastic elastomer material is DSM Arnitel® EL250. In some embodiments, the thermoplastic elastomer has a melt index of at least 25 g/10 min.

In an embodiment, seal layer 14 comprises a thermoplastic elastomer material. Seal layer 14 may be one of several different percentages of a thermoplastic elastomer material or fall within one of several different ranges. The amount of the thermoplastic elastomer material seal layer 14 comprises may be selected from the following values: about 30%, about 40%, about 50%, about 55%, about 58%, about 60%, about 65%, about 70%, about 75%, about 80%, about 85%, about 86%, about 87%, about 88%, about 89%, about 90%, about 95%, and about 100%. It is within the scope of the present disclosure for the percentage by weight of the thermoplastic elastomer material of seal layer 14 to fall within one of many different ranges. In a set of ranges, the percentage by weight of the thermoplastic elastomer material of seal layer 14 is one of the following ranges: about 0% to about 100%, about 20% to about 100%, about 40% to about 100%, about 20% to about 99%, about 20% to about 95%, about 30% to about 95%, about 50% to about 95%, about 60% to about 95%, and about 60% to about 90%. In an example, seal layer 14 comprises about 88% thermoplastic elastomer material. In an exemplary embodiment, seal layer 14 comprises about 88% DSM Arnitel® EL250. In another example, seal layer 14 comprises about 58% thermoplastic elastomer material. In an exemplary embodiment, seal layer 14 comprises about 58% DSM Arnitel® EL250. It should be understood the values and ranges described herein are equally applicable when the thermoplastic elastomer material comprises a copolyester elastomer, a polyether ester elastomer, thermoplastic polyester elastomer, a TPC-ET material, and combinations thereof.

In certain embodiments, seal layer 14 comprises a percentage of a thermoplastic elastomer material and a percentage of polyethylene copolymer material. Seal layer 14 may comprise one of several different percentages of thermoplastic elastomer material or fall within one of several different ranges. The amount of the thermoplastic elastomer material for seal layer 14 may be selected from the following values: about 20%, about 30%, about 40%, about 45%, about 50%, about 51%, about 52%, about 53%, about 54%, about 55%, about 56%, about 57%, about 58%, about 59%, about 60%, about 61%, about 62%, about 63%, about 64%, about 65%, about 70%, about 75%, about 80%, about 85%, about 90%, about 95%, and about 99%. It is within the scope of the present disclosure for the percentage by weight of the thermoplastic elastomer material of seal layer 14 to fall within one of many different ranges. In a set of ranges, the percentage by weight of the thermoplastic elastomer material of seal layer 14 is one of the following ranges: about 0% to about 100%, about 20% to about 100%, about 40% to about 100%, about 20% to about 99%, about 20% to about 95%, about 30% to about 95%, about 40% to about 95%, about 50% to about 95%, about 50%, to about 90%, about 50% to about 80%, about 50% to about 70%, and about 50% to about 65%. It should be understood the values and ranges described herein are equally applicable when the thermoplastic elastomer material comprises a copolyester elastomer, a polyether ester elastomer, thermoplastic polyester elastomer, a TPC-ET material, and combinations thereof.

The amount of the polyethylene copolymer material for seal layer 14 may be selected from the following values: about 1%, about 5%, about 10%, about 15%, about 20%, about 25%, about 26%, about 27%, about 28%, about 29%, about 30%, about 31%, about 32%, about 33%, about 34%, about 35%, about 40%, about 50%, about 60%, about 80%, about 90%, about 99%, and about 100%. It is within the scope of the present disclosure for the percentage by weight of the polyethylene copolymer material of seal layer 14 to fall within one of many different ranges. In a set of ranges, the percentage by weight of the polyethylene copolymer material of seal layer 14 is one of the following ranges: about 0% to about 100%, about 5% to about 95%, about 10% to about 80%, about 10% to about 60%, about 15% to about 60%, about 15% to about 50%, about 20% to about 50%, and about 20%, to about 40%. It should be understood that the values and ranges described herein are equally applicable when the polyethylene copolymer material comprises an ethylene methyl acrylate copolymer material.

Illustratively, seal layer 14 may comprise a blend of about 60% thermoplastic elastomer material and about 30% polyethylene copolymer material. In an illustrative embodiment, seal layer 14 comprises about 58% thermoplastic elastomer material and about 30% polyethylene copolymer material. In an exemplary embodiment, seal layer 14 comprises a blend of about 58% DSM Arnitel® EL250 and about 30% Westlake Chemical EMAC® SP2205.

In some embodiments, the polyethylene copolymer material has a melt index of about 2 g/10 min. In some embodiments, the polyethylene copolymer material is an ethylene methyl acrylate copolymer material. In an illustrative embodiment, the polyethylene copolymer material is Westlake Chemical EMAC® SP2205.

In some embodiments, the methyl acrylate percentage of the ethylene methyl acrylate copolymer material may be one of several different percentages. The weight percentage of methyl acrylate of the ethylene acrylate copolymer material may be one of the following values: about 4%, about 10%, about 15%, about 16%, about 17%, about 18%, about 20%, about 21%, about 22%, about 23%, about 24%, about 25%, about 26%, about 30%, about 35%, and about 40% by weight. It is within the present disclosure for the weight percentage of methyl acrylate of the ethylene acrylate copolymer material to fall within one of many different ranges. In a set of ranges, the weight percentage of methyl acrylate of the ethylene acrylate copolymer material is one of the following ranges: about 15% to about 30%, about 15% to about 26%, about 18% to about 26%, about 18% to about 25%, and about 18% to about 24%, and about 19% to about 20% by weight. In an example, the weight percentage of methyl acrylate of the ethylene acrylate copolymer material is about 20 wt %.

In an embodiment described herein, seal layer 14 may optionally include one or more additives such as slip agents or anti-block agents. In an embodiment, seal layer 14 may include a slip agent. In some embodiments, seal layer 14 may include an anti-block agent to prevent the multi-layer film 10 from sticking to itself in roll form. In some embodiments, seal layer 14 may include a slip agent and an anti-block agent. Illustratively, the slip agent may be a fatty acid with a polyethylene carrier. In an embodiment, the slip agent is Ampacet 10090. In certain embodiments, the percentage by weight of the slip agent may fall within a set of ranges including, about 1% to about 10%, about 2% to about 10%, about 3% to about 10%, and about 3% to about 8%. Illustratively, the anti-block agent may be a high-clarity inorganic anti-block agent. In another embodiment, the anti-block agent may be ABC5000HC available from the Polyfil Corporation. In certain embodiments, the percentage by weight of the anti-block agent may fall within a set of ranges including about 1% to about 10%, about 2% to about 10%, about 3% to about 10%, and about 3% to about 8%.

In an exemplary embodiment, seal layer 14 comprises a thermoplastic elastomer, a slip agent, and an anti-block agent. In an embodiment, seal layer 14 comprises about 88% thermoplastic elastomer, about 6% slip agent, and about 6% anti-block agent. In yet another embodiment, seal layer 14 comprises about 88% DSM Arnitel® EL250, about 6% Ampacet 10090, and about 6% Polyfil Corporation ABC5000HC.

In another exemplary embodiment, seal layer 14 comprises a thermoplastic elastomer, a polyethylene copolymer material, a slip agent, and an anti-block agent. In an embodiment, seal layer 14 comprises about 58% thermoplastic elastomer, about 30% polyethylene copolymer, about 6% slip agent, and about 6% anti-block agent. In yet another embodiment, seal layer 14 comprises about 58% DSM Arnitel® EL250, about 30% Westlake Chemical EMAC® SP2205, about 6% Ampacet 10090, and about 6% Polyfil Corporation ABC5000HC.

Multi-layer film 110 includes skin layer 112, seal layer 114, and core layer 116 configured to extend between and interconnect skin layer 112 and seal layer 114, as shown in FIG. 5. Seal layer 114 is configured to seal multi-layer film 110 to the brim 30 of container 32. Illustratively, seal layer 114 comprises a thermoplastic elastomer and is configured to bond to a PET container so as to peel away cleanly from brim 30 and leave behind no residue when removed.

In an embodiment, multi-layer film 110 is about 1 mil to about 3.0 mils thick. Multi-layer film 110 may be a particular thickness or fall within one of several different ranges. The thickness of multi-layer film 110 may be one of the following values: about 1 mil, about 1.1 mils, about 1.2 mils, about 1.3 mils, about 1.4 mils, about 1.5 mils, about 1.6 mils, about 1.7 mils, about 1.8 mils, about 1.9 mils, about 2 mils, about 2.1 mils, about 2.2 mils, about 2.3 mils, about 2.4 mils, about 2.5 mils, about 2.6 mils, about 2.7 mils, about 2.8 mils, and about 3.0 mils. The thickness of multi-layer film 110 may fall within one of many different ranges. In a set of ranges, the thickness of multi-layer film 110 is one of the following ranges: about 1 mil to about 3 mils, about 1.5 mils to about 3.0 mils, about 1.7 mils to about 3.0 mils, about 1.7 mils to about 2.7 mils, about 1.8 mils to about 2.6 mils, and about 1.9 mils to about 2.6 mils. In an embodiment, multi-layer film 110 is about 2.5 mils thick.

In an embodiment, multi-layer film 110 has a density of about 0.8 g/cm$^3$ to about 1.1 g/cm$^3$. Multi-layer film 110 may have a particular density or fall within one of several different ranges. The density of multi-layer film 110 may be one of the following values: about 0.8 g/cm$^3$, about 0.85 g/cm$^3$, about 0.9 g/cm$^3$, about 0.91 g/cm$^3$, about 0.92 g/cm$^3$, about 0.93 g/cm$^3$, about 0.94 g/cm$^3$, about 0.95 g/cm$^3$, about 0.96 g/cm$^3$, about 0.97 g/cm$^3$, about 0.98 g/cm$^3$, about 0.99 g/cm$^3$, about 1 g/cm$^3$, and about 1.1 g/cm$^3$. The density of multi-layer film 110 may fall within one of many different ranges. In a set of ranges, the density of multi-layer film 110 is one of the following ranges: about 0.8 g/cm$^3$ to about 1.1 g/cm$^3$, about 0.85 g/cm$^3$ to about 1.1 g/cm$^3$, about 0.85 g/cm$^3$ to about 1 g/cm$^3$, about 0.9 g/cm$^3$ to about 1 g/cm$^3$, and about 0.95 g/cm$^3$ to about 1 g/cm$^3$. In an example, multi-layer film has a density of about 0.96 g/cm$^3$. In an example, multi-layer film has a density of about 0.97 g/cm$^3$.

In an embodiment, skin layer 112 forms exterior surface 22 of package 40, as shown in FIG. 5. Illustratively, skin layer 112 provides stiffness to multi-layer film 110.

In an embodiment, skin layer 112 is about 30% to about 70% of the total thickness of multi-layer film 110. Skin layer 112 may be one of several different percentages of the total thickness of multi-layer film 110 or fall within one of several different ranges. The percentage thickness of skin layer 112 of multi-layer film 110 may be one of the following values: about 30%, about 35%, about 40%, about 45%, about 46%, about 47%, about 48%, about 49%, about 50%, about 55%, about 60%, and about 70% of the total thickness of multi-layer film 110. It is within the present disclosure for the thickness of skin layer 112 to fall within one of many different ranges. In a set of ranges, the thickness range of skin layer 112 is one of the following ranges: about 30% to about 70%, about 35% to about 70%, about 35% to about 65%, about 40% to about 65%, and about 40% to about 60% of the total thickness multi-layer film 110. In an example, skin layer 112 is about 55% of the total thickness of multi-layer film 110.

In an embodiment, skin layer 112 is about 0.7 mils to about 1.6 mils thick. Skin layer 112 may be a particular thickness or fall within one of several different ranges. The thickness of skin layer 112 may be one of the following values: about 0.7 mils, about 0.8 mils, about 0.9 mils, about 1 mils, about 1.1 mils, about 1.2 mils, about 1.3 mils, about 1.4 mils, about 1.5 mils, and about 1.6 mils. The thickness of skin layer 112 may fall within one of many different ranges. In a set of ranges, the thickness of skin layer 112 is one of the following ranges: about 0.7 mils to about 1.6 mils, about 0.7 mils to about 1.5 mils, about 0.9 mils to about 1.5 mils, and about 0.9 mils to about 1.4 mils. In an embodiment, skin layer 112 is about 1.2 mils thick.

In an embodiment, skin layer 112 comprises a polyethylene material. In some embodiments, first core sub-layer 26 comprises a linear medium-density polyethylene (LMDPE). In some embodiments, skin layer 112 comprises a linear low-density polyethylene (LLDPE) material. In an embodiment, the polyethylene material comprises an ethylene-hexene copolymer (C-6). In some embodiments, the polyethylene material has a melt index of about 4.3 g/10 min. In some embodiments, the polyethylene material is ExxonMobil™ LLDPE LL 3404.48. In some embodiments, the polyethylene material has an ethylene-octene copolymer (C-8). In some embodiments, the polyethylene material has a melt index of about 6 g/10 min. In some embodiments, skin layer 112 comprises Dow® DOWLEX™ 2035. Illustratively, skin layer 112 comprises a formulation comprising a blend of polyethylene materials. In an embodiment, skin layer 112 comprises an ethylene-hexene copolymer and an ethylene-octene copolymer material. In an embodiment, skin layer 112 comprises a first polyethylene material and a second polyethylene material. Illustratively, skin layer 112 comprises a blend of ExxonMobil™ LLDPE LL 3404.48 and Dow® DOWLEX™ 2035.

In some embodiments, skin layer 112 comprises a first polyethylene material. In some embodiments, skin layer 112 comprises a blend of an polyethylene materials. In some embodiments, skin layer 112 comprises a blend of a first polyethylene material and a second polyethylene material. In some embodiments, the first polyethylene material is an ethylene-hexene copolymer material. In some embodiments, the second polyethylene material is an ethylene-octene copolymer material. In some embodiments, the first polyethylene material is ExxonMobil™ LLDPE LL 3404.4. In some embodiments, the second polyethylene material is Dow® DOWLEX™ 2035.

In certain embodiments, skin layer 112 comprises a percentage of a first polyethylene material and a percentage of a second polyethylene material. First core sub-layer 26 may comprise one of several different percentages of a first polyethylene material or fall within one of several different ranges. The amount of the first polyethylene material for skin layer 112 may be selected from the following values: about 20%, about 40%, about 60%, about 70%, about 75%, about 77%, about 78%, about 79%, about 80%, about 81%, about 82%, about 85%, about 90%, and about 100%. In some embodiments, skin layer 112 does not comprise a first polyethylene material. In some embodiments, skin layer 112 does not comprise an ethylene-hexene copolymer material. It is within the present disclosure for the percentage by weight of the first polyethylene material of skin layer 112 to fall within one of many different ranges. In a set of ranges, the percentage by weight of the first polyethylene material of skin layer 112 is one of the following ranges: about 0% to about 100%, about 20% to about 100%, about 40% to about 100%, about 40% to about 95%, about 40% to about 90%, about 50% to about 90%, about 60% to about 90%, and about 70% to about 90%. It should be understood that the ranges and values described herein are equally applicable when the first polyethylene material comprises an LLDPE material, an LMDPE material, or an ethylene-hexene copolymer material.

It is within the scope of the present disclosure to select an amount of the second polyethylene material for skin layer 112 from the following values: about 100%, about 80%, about 60%, about 40%, about 30%, about 25%, about 23%, about 22%, about 21%, about 20%, about 19%, about 18%, about 15%, and about 10%. In some embodiments, skin layer 112 does not comprise a second polyethylene material. In some embodiments, skin layer 112 does not comprise an ethylene-octene copolymer material. It is within the present disclosure for the percentage by weight of the second polyethylene material of skin layer 112 to fall within one of many different ranges. In a set of ranges, the percentage by weight of the second polyethylene material of skin layer 112 is one of the following ranges: about 0% to about 100%, about 0% to about 80%, about 5% to about 80%, about 5% to about 60%, about 5% to about 40%, about 10% to about 40%, and about 10% to about 30%. It should be understood that the values ranges described herein are equally applicable when the second polyethylene material comprises an LLDPE material, an LMDPE material, or an ethylene-octene copolymer material.

In an embodiment described herein, skin layer 112 may optionally comprise one or more additives such as slip agents or anti-block agents. In an embodiment, skin layer 112 comprises an anti-block agent. In an embodiment, the anti-block agent is Polyfil Corporation ABC5000HC. In certain embodiments, the percentage by weight of the anti-block agent may fall within a set of ranges including, about 0% to about 5%, about 0.5% to about 5%, about 0.5% to about 3%, and about 1% to about 5%. In an example, skin layer 112 comprises a blend of about 79% of an ethylene-hexene copolymer material, about 20% of an ethylene-octene copolymer material, and about 1% of an anti-block agent. In an example, skin layer 112 comprises a blend of about 79% ExxonMobil™ LLDPE LL 3404.4, about 20% Dow® DOWLEX™ 2035, and about 1% Polyfil Corporation ABC5000HC.

Core layer 116 extends between and interconnects skin layer 112 and seal layer 114, as shown in FIG. 5. Illustratively, core layer 116 may be a tie-layer and may provide stiffness to multi-layer film 110.

In an embodiment, core layer 116 is about 5% to about 55% of the total thickness of multi-layer film 110. Core layer 116 may be one of several different percentages of the total thickness of multi-layer film 110 or fall within one of several different ranges. The percentage thickness of core layer 116 of multi-layer film 110 may be one of the following values: about 5%, about 10%, about 14%, about 15%, about 16%, about 17%, about 18%, about 20%, about 25%, about 30%, about 40%, and about 55% of the total thickness of multi-layer film 110. It is within the present disclosure for the thickness of core layer 116 to fall within one of many different ranges. In a set of ranges, the thickness range of core layer 116 is one of the following ranges: about 5% to about 55%, about 5% to about 40%, about 5% to about 35%, about 5% to about 30%, about 10% to about 30%, and about 16% to about 30% of the total thickness multi-layer film 110. In an example, core layer 116 is about 25% of the total thickness of multi-layer film 110.

In an embodiment, core layer 116 is about 0.1 mils to about 1.1 mils thick. Core layer 116 may be a particular thickness or fall within one of several different ranges. The thickness of core layer 116 may be one of the following values: about 0.1 mils, about 0.2 mils, about 0.3 mils, about 0.4 mils, about 0.5 mils, about 0.6 mils, about 0.8 mils, about 1 mil, and about 1.1 mils. The thickness of core layer 116 may fall within one of many different ranges. In a set of ranges, the thickness of core layer 116 is one of the following ranges: about 0.1 mils to about 1.1 mils, about 0.2 mils to about 1.1 mils, about 0.2 mils to about 0.9 mils, and about 0.2 mils to about 0.8 mils. In an embodiment, core layer 116 is about 0.4 mils thick.

In an embodiment, core layer 116 comprises a polyethylene material. In another embodiment, core layer 116 comprises a polyethylene copolymer material. In some embodiments, the polyethylene material has a melt index of about 2 g/10 min. In some embodiments, the polyethylene material is an ethylene methyl acrylate copolymer material. In an illustrative embodiment, the polyethylene copolymer material is Westlake Chemical EMAC® SP2205.

In some embodiments, the methyl acrylate percentage of the ethylene methyl acrylate copolymer material may be one of several different percentages. The weight percentage of methyl acrylate of the ethylene acrylate copolymer material may be one of the following values: about 4%, about 10%, about 15%, about 16%, about 17%, about 18%, about 20%, about 21%, about 22%, about 23%, about 24%, about 25%, about 26%, about 30%, about 35%, and about 40% by weight. It is within the present disclosure for the weight percentage of methyl acrylate of the ethylene acrylate copolymer material to fall within one of many different ranges. In a set of ranges, the weight percentage of methyl acrylate of the ethylene acrylate copolymer material is one of the following ranges: about 15% to about 30%, about 15% to about 26%, about 18% to about 26%, about 18% to about 25%, about 18% to about 24%, and about 19% to about 20% by weight. In an example, the weight percentage of methyl acrylate of the ethylene acrylate copolymer material is about 20 wt %.

Seal layer 114 forms a temporary seal with brim 30 of container 32 and can be peeled away cleanly without leaving residue or stringers attached to brim 30. Seal layer 14 comprises a low viscosity resin so closure 24 seals with the brim 30 to provide a hermetic seal. Seal layer 114 forms interior surface 34 of closure 24 and is arranged to face interior product-storage region 36 of container 32, as shown in FIG. 5.

In an embodiment, seal layer 114 is about 5% to about 40% of the total thickness of multi-layer film 110. Seal layer 114 may be one of several different percentages of the total thickness of multi-layer film 110 or fall within one of several different ranges. The percentage thickness of seal layer 114 of multi-layer film 110 may be one of the following values: about 5%, about 10%, about 14%, about 15%, about 16%, about 17%, about 18%, about 19%, about 20%, about 30%, and about 40% of the total thickness of multi-layer film 110. It is within the present disclosure for the thickness of seal layer 114 to fall within one of many different ranges. In a set of ranges, the thickness range of seal layer 114 is one of the following ranges: about 5% to about 40%, about 5% to about 30%, about 5% to about 25%, about 10% to about 25%, about 10% to about 20%, and about 15% to about 20% of the total thickness multi-layer film 110. In an example, seal layer 114 is about 20% of the total thickness of multi-layer film 110.

In an embodiment, seal layer 114 is about 0.1 mils to about 1 mil thick. Seal layer 114 may be a particular thickness or fall within one of several different ranges. The thickness of seal layer 114 may be one of the following values: about 0.1 mils, about 0.2 mils, about 0.3 mils, about 0.4 mils, about 0.5 mils, about 0.6 mils, about 0.8 mils, and about 1 mil. The thickness of seal layer 114 may fall within one of many different ranges. In a set of ranges, the thickness of seal layer 114 is one of the following ranges: about 0.1 mils to about 1 mils, about 0.2 mils to about 1 mils, about 0.2 mils to about 0.8 mils, and about 0.2 mils to about 0.6 mils. In an embodiment, seal layer 114 is about 0.4 mils thick.

In an embodiment, seal layer 114 comprises a thermoplastic elastomer material. In some embodiments, seal layer 114 comprises a copolyester elastomer. In some embodiments, seal layer 114 comprises a polyether ester elastomer. In some embodiments, seal layer 114 comprises a thermoplastic polyester elastomer. In an exemplary embodiment, the thermoplastic elastomer comprises a block copolymer of alternating hard segments and soft segments, as described by ISO 18064. In an embodiment, the thermoplastic elastomer material is a copolyester thermoplastic elastomer (TPC) material. In some embodiments, the thermoplastic elastomer material is a TPC with a polyether soft segment (TPC-ET) according to ISO 18064. In some embodiments, the thermoplastic elastomer material has a melt flow index of about 25 g/10 min. In some embodiments, the thermoplastic elastomer material has a melt volume-flow rate of about 35 cm$^3$/10 min as measured by ISO 1133. In some embodiments, the thermoplastic elastomer has a melt flow index selected from a range of: about 20 g/10 min to about 45 g/10 min, about 20 g/10 min to about 38 g/10 min, and about 25 g/10 min to about 35 g/10 min. In some embodiments, the thermoplastic elastomer material has a tensile modulus of about 25 MPa according to ISO 527-1/-2. In some embodiments, the thermoplastic elastomer material is DSM Arnitel® EL250. In some embodiments, the thermoplastic elastomer has a melt index of at least 25 g/10 min.

In an embodiment, seal layer 114 comprises a thermoplastic elastomer material. Seal layer 14 may be one of several different percentages of a thermoplastic elastomer material or fall within one of several different ranges. The amount of the thermoplastic elastomer material seal layer 114 comprises may be selected from the following values: about 30%, about 40%, about 50%, about 55%, about 58%, about 60%, about 65%, about 70%, about 75%, about 80%, about 85%, about 86%, about 87%, about 88%, about 89%, about 90%, about 95%, and about 100%. In a set of ranges, the percentage by weight of the thermoplastic elastomer material of seal layer 114 is one of the following ranges: about 0% to about 100%, about 20% to about 100%, about 40% to about 100%, about 20% to about 99%, about 20% to about 95%, about 30% to about 95%, about 50% to about 95%, about 60% to about 95%, and about 60% to about 90%. In an example, seal layer 114 comprises about 88% thermoplastic elastomer material. In an exemplary embodiment, seal layer 114 comprises about 88% DSM Arnitel® EL250. In another example, seal layer 114 comprises about 58% thermoplastic elastomer material. In an exemplary embodiment, seal layer 114 comprises about 58% DSM Arnitel® EL250. It should be understood the values and ranges described herein are equally applicable when the thermoplastic elastomer material comprises a copolyester elastomer, a polyether ester elastomer, thermoplastic polyester elastomer, a TPC-ET material, and combinations thereof.

In certain embodiments, seal layer 114 comprises a percentage of a thermoplastic elastomer material and a percentage of polyethylene copolymer material. Seal layer 14 may comprise one of several different percentages of thermoplastic elastomer material or fall within one of several different ranges. The amount of the thermoplastic elastomer material for seal layer 114 may be selected from the following values: about 20%, about 30%, about 40%, about 45%, about 50%, about 51%, about 52%, about 53%, about 54%, about 55%, about 56%, about 57%, about 58%, about 59%, about 60%, about 61%, about 62%, about 63%, about 64%, about 65%, about 70%, about 75%, about 80%, about 85%, about 90%, about 95%, and about 99%. It is within the scope of the present disclosure for the percentage by weight of the thermoplastic elastomer material of seal layer 114 to fall within one of many different ranges. In a set of ranges, the percentage by weight of the thermoplastic elastomer material of seal layer 114 is one of the following ranges: about 0% to about 100%, about 20% to about 100%, about 40% to about 100%, about 20% to about 99%, about 20% to about 95%, about 30% to about 95%, about 40% to about 95%, about 50% to about 95%, about 50%, to about 90%, about 50% to about 80%, about 50% to about 70%, and about 50% to about 65%. It should be understood the values and ranges described herein are equally applicable when the thermoplastic elastomer material comprises a copolyester elastomer, a polyether ester elastomer, thermoplastic polyester elastomer, a TPC-ET material, and combinations thereof.

The amount of the polyethylene copolymer material for seal layer 114 may be selected from the following values: about 1%, about 5%, about 10%, about 15%, about 20%, about 25%, about 26%, about 27%, about 28%, about 29%, about 30%, about 31%, about 32%, about 33%, about 34%, about 35%, about 40%, about 50%, about 60%, about 80%, about 90%, about 99%, and about 100%. It is within the scope of the present disclosure for the percentage by weight of the polyethylene copolymer material of seal layer 114 to fall within one of many different ranges. In a set of ranges, the percentage by weight of the polyethylene copolymer material of seal layer 114 is one of the following ranges: about 0% to about 100%, about 5% to about 95%, about 10% to about 80%, about 10% to about 60%, about 15% to about 60%, about 15% to about 50%, about 20% to about 50%, and about 20%, to about 40%. It should be understood that the values and ranges described herein are equally applicable when the polyethylene copolymer material comprises an ethylene methyl acrylate copolymer material.

In an embodiment, seal layer 114 comprises a polyethylene material. In another embodiment, seal layer 114 comprises a polyethylene copolymer material. In some embodiments, the polyethylene material has a melt index of about 2 g/10 min. In some embodiments, the polyethylene material is an ethylene methyl acrylate copolymer material. In an illustrative embodiment, the polyethylene copolymer material is Westlake Chemical EMAC® SP2205.

In some embodiments, the methyl acrylate percentage of the ethylene methyl acrylate copolymer material may be one of several different percentages. The weight percentage of methyl acrylate of the ethylene acrylate copolymer material may be one of the following values: about 4%, about 10%, about 15%, about 16%, about 17%, about 18%, about 20%, about 21%, about 22%, about 23%, about 24%, about 25%, about 26%, about 30%, about 35%, and about 40% by weight. It is within the present disclosure for the weight percentage of methyl acrylate of the ethylene acrylate copolymer material to fall within one of many different ranges. In a set of ranges, the weight percentage of methyl acrylate of the ethylene acrylate copolymer material is one of the following ranges: about 15% to about 30%, about 15% to about 26%, about 18% to about 26%, about 18% to about 25%, and about 18% to about 24%, and about 19% to about 20% by weight. In an example, the weight percentage of methyl acrylate of the ethylene acrylate copolymer material is about 20 wt %.

Illustratively, seal layer 114 may comprise a blend of about 60% thermoplastic elastomer material and about 30% polyethylene copolymer material. In an illustrative embodiment, seal layer 114 comprises about 58% thermoplastic elastomer material and about 30% polyethylene copolymer material. In an exemplary embodiment, seal layer 114 comprises a blend of about 58% DSM Arnitel® EL250 and about 30% Westlake Chemical EMAC® SP2205.

In an embodiment described herein, seal layer 114 may optionally include one or more additives such as slip agents or anti-block agents. In an embodiment, seal layer 114 may include a slip agent. In some embodiments, seal layer 114 may include an anti-block agent to prevent the multi-layer film 10 from sticking to itself in roll form. In some embodiments, seal layer 114 may include a slip agent and an anti-block agent. Illustratively, the slip agent may be a fatty acid with a polyethylene carrier. In an embodiment, the slip agent is Ampacet 10090. In certain embodiments, the percentage by weight of the slip agent may fall within a set of ranges including, about 1% to about 10%, about 2% to about 10%, about 3% to about 10%, and about 3% to about 8%. Illustratively, the anti-block agent may be a high-clarity inorganic anti-block agent. In another embodiment, the anti-block agent may be ABC5000HC available from the Polyfil Corporation. In certain embodiments, the percentage by weight of the anti-block agent may fall within a set of ranges including about 1% to about 10%, about 2% to about 10%, about 3% to about 10%, and about 3% to about 8%.

In an exemplary embodiment, seal layer 114 comprises a thermoplastic elastomer, a slip agent, and an anti-block agent. In an embodiment, seal layer 114 comprises about 88% thermoplastic elastomer, about 6% slip agent, and about 6% anti-block agent. In yet another embodiment, seal layer 114 comprises about 88% DSM Arnitel® EL250, about 6% Ampacet 10090, and about 6% Polyfil Corporation ABC5000HC.

In another exemplary embodiment, seal layer 114 comprises a thermoplastic elastomer, a polyethylene copolymer material, a slip agent, and an anti-block agent. In an embodiment, seal layer 114 comprises about 58% thermoplastic elastomer, about 30% polyethylene copolymer, about 6% slip agent, and about 6% anti-block agent. In yet another embodiment, seal layer 114 comprises about 58% DSM Arnitel® EL250, about 30% Westlake Chemical EMAC® SP2205, about 6% Ampacet 10090, and about 6% Polyfil Corporation ABC5000HC.

In another aspect, each of the formulations for the layers and sub-layers of the multi-layer films can further include barrier additives. For example, each layer or sublayer can contain ethylene vinyl alcohol (EVOH), polyvinylidene chloride, polyamide, or polyethylene terephthalate. In another aspect, the formulations for each layer or sublayer can contain any combination of the barrier additives to produce a multi-layer film specific for the desired packaging process.

In another aspect, a multi-layer film in accordance with the present disclosure may include additional layers to form a delaminating multi-layer film. As an example, a multi-layer film can include additional layers that melt together during the heat sealing process to form a sealant ring. The sealant ring then remains coupled with the brim of the container when the closure is removed. In an embodiment, the closure can be reapplied to the sealant ring to re-form the seal between the closure and the container.

A multi-layer film, sometimes called a lidding film, is designed to seal and peel to PET-based containers for use in food packaging applications. Suitable PET containers used for sealing would include, but not limited to amorphous PET (APET), crystalline PET (CPET), glycol-modified PET (PETG), and recycled PET (RPET) (100% post-consumer). The multi-layer film may be sealed to the container or substrate using conduction heat-sealing equipment. The seal layer may be a thermoplastic elastomer, which promotes good caulkability (low elastic modulus) to seal around contamination. The seal layer may provide a strong temporary seal with high burst strength.

Multi-layer films in accordance with the present disclosure may have various characteristics including gauge, yield, average basis weight, moisture vapor transmission rate (MVTR), oxygen transmission rate (OTR), haze, tensile strength in the machine direction (MD), tensile strength is the transverse direction (TD), elongation in the machine direction (MD), elongation in the transverse direction (TD), 1% secant modulus in the machine direction (MD), and 1% secant modulus in the transverse direction (TD). In one example, the gauge is about 2.5 mils. In one example, the yield is 10,511 sq/inches/lb. In one example, the basis weight is 41.1 lbs/3000 sq. ft. In one example, MVTR may be less than about 0.55 g/100 in$^2$/day at 100° F. and 90% RH (Relative Humidity). In one example, OTR may be less than about 7.5 cc/100 in$^2$/day at 73° F. and 0% RH (Relative Humidity). In one example, haze is about 20%. In one example, tensile strength MD is about 7,100 psi. In one example, tensile strength TD is about 7,850 psi. In one example, elongation MD is about 115%. In one example, elongation TD is about 95%. In one example, 1% secant modulus MD is about 149,100 psi. In one example, 1% secant modulus is about 165,450 psi.

In some embodiments, a package for use in high-pressure pasteurization comprises a container comprising a polyester material, the container including a bowl formed to include an interior product-storage region therein and a brim coupled to the bowl and formed to include a mouth arranged to open into the interior product-storage region and a closure coupled to the brim of the container to close selectively the mouth, the closure including a multi-layer film including a skin layer, a core layer coupled to the skin layer and located between the skin layer and the container, and a seal layer arranged to extend between and interconnect the core layer and the brim of the container, wherein the multi-layer film comprises a thermoplastic elastomer and is configured with the means for bonding temporarily to the brim of the container to establish a hermetic seal that survives a pasteurization process and peels away from the brim after a pasteurization process to expose the mouth without leaving any portion of the multi-layer film behind coupled to the brim when a user applies a peel force to the multi-layer film.

In some embodiments, a multi-layer film comprises a skin layer, a core layer comprising a polyethylene material, and a seal layer comprising a copolyester thermoplastic elastomer material and arranged to lie in spaced-apart relation to the skin layer to locate the core layer between the skin layer and the seal layer, wherein the multi-layer film is configured with the means for bonding temporarily to a brim of a container so that the multi-layer film peels away from the brim exposing a mouth formed in the brim without leaving any portion of the multi-layer film behind on the brim when a user applies a peel force to the multi-layer film.

In some embodiments, a package for use in high-pressure pasteurization consists of a container comprising a polyester material, the container including a bowl formed to include an interior product-storage region therein and a brim coupled to the bowl and formed to include a mouth arranged to open into the interior product-storage region and a closure coupled to the brim of the container to close selectively the mouth, the closure including a multi-layer film including a skin layer, a core layer coupled to the skin layer and located between the skin layer and the container, and a seal layer arranged to extend between and interconnect the core layer and the brim of the container, wherein the multi-layer film comprises a thermoplastic elastomer and is configured with the means for bonding temporarily to the brim of the container so that the multi-layer film peels away from the brim after a pasteurization process exposing the mouth without leaving any portion of the multi-layer film behind on the brim when a user applies a peel force to the multi-layer film.

In some embodiments, a multi-layer film consists of a skin layer, a core layer comprising a polyethylene material, and a seal layer comprising a copolyester thermoplastic elastomer material and arranged to lie in spaced-apart relation to the skin layer to locate the core layer between the skin layer and the seal layer, wherein the multi-layer film is configured with the means for bonding temporarily to a brim of a container so that the multi-layer film peels away from the brim exposing a mouth formed in the brim without leaving any portion of the multi-layer film behind on the brim when a user applies a peel force to the multi-layer film.

In some embodiments, seal layer 14, 114 consists of a thermoplastic elastomer, an anti-block agent, and a slip agent. In some embodiments, skin layer 12, 112 consists of a thermoplastic elastomer, an ethylene copolymer, an anti-block agent, and a slip agent.

In some embodiments, a first core sub-layer 26 consists of a first polyethylene material, a second polyethylene material, and an anti-block agent. In some embodiments, skin layer 112 consists of a first polyethylene material, a second polyethylene material, and an anti-block agent.

EXAMPLES

The following examples are set forth for purposes of illustration only. Parts and percentages appearing in such examples are by weight unless otherwise stipulated. All ASTM, ISO, and other standard test methods cited or referred to in this disclosure are incorporated by reference in their entirety.

Example 1

Formulation, Extrusion, and Lamination

An exemplary multi-layer film in accordance with certain aspects of the present disclosure is provided in the instant example. The multi-layer film in this example is a five sub-layer co-extruded and laminated film. For purposes of illustration, each sub-layer of the multi-layer film is numbered successively in reference to Table 1 of the present disclosure to correlate the sub-layer composition with the sub-layer thickness. The instant example is provided to evaluate the composition and thickness parameters of the exemplary multi-layer film.

A seal layer (1.1 of Table 1) comprises DSM Arnitel® EL250 thermoplastic elastomer. Ampacet 10090 was added as a slip agent and Polyfil ABC5000HC was added as an anti-block agent. The percentages by weight of the components were about:

| | |
|---|---|
| 88% | DSM Arnitel ® EL250 |
| 6% | Polyfil ABC5000HC |
| 6% | Ampacet 10090 |

The resins, slip agent, and anti-block were added to an extruder hopper and combined via blending to provide a formulation. The formulation was then heated in the extruder to form a molten material.

A second core sub-layer (1.2 of Table 1) comprises Westlake Chemical EMAC® SP2205. The percentages by weight of the components were about:
100% Westlake Chemical EMAC® SP2205
The resin was added to an extruder hopper to form a formulation. The formulation was heated in the extruder to form a molten material.

A second core sub-layer (1.3 of Table 1) comprises ExxonMobil™ LLDPE LL 3404.48 and Dow® DOWLEX™ 2035 as the LLDPE base resins. Polyfil ABC5000HC was added as an anti-block agent. The percentages by weight of the components were about:

| | |
|---|---|
| 79% | ExxonMobil ™ LLDPE LL 3404.48 |
| 20% | Dow ® DOWLEX ™ 2035 |
| 1% | Polyfil ABC5000HC |

The resins and antiblock were added to an extruder hopper and combined via blending to provide a formulation. The formulation was then heated in the extruder to form a molten material.

The molten materials described above were co-extruded and blown to form a multi-layer film with a gauge of 2.0 mils, a density of 0.9669 g/cm$^3$, and a thickness as described in Table 1.

A second skin sub-layer (1.4 of Table 1) comprises The Dow Chemical Company™ MOR-FREE™ L75-164 C/C-411 as a laminating adhesive that is applied to the core layer of the cast coextruded film.

A second skin sub-layer (1.5 of Table 1) comprises Toray Lumirror® PA10 film as the OPET material. The Toray Lumirror® PA10 is laminated to the core layer to form the multi-layer film with a gauge of 2.5 mils, and a thickness as described in Table. 1.

TABLE 1

Target Sub-layer Thicknesses

| Layer | Thickness (%) | Thickness (mil) |
|---|---|---|
| 1.1 | 16 | 0.4 |
| 1.2 | 16 | 0.4 |
| 1.3 | 48 | 1.2 |
| 1.4 | 0.8 | 0.02 |
| 1.5 | 19.2 | 0.48 |

Example 2

Multi-Layer Film Properties

The formulation and process of a multi-layer film in accordance with Example 1 were evaluated. The co-extruded film as described in Example 1 was found to have the properties described in Table 2. MVTR is measured according to ASTM Method F1249 and has units of g/100 in$^2$/day at 100° F. and 90% RH (Relative Humidity). OTR is measured according to ASTM D3985 and has units of cc/100 in$^2$/day at 73° F., 100% oxygen and 0% RH (Relative Humidity). Tensile strength is measured according to ASTM D882 in both the machine direction (MD) and transverse direction (TD). Elongation is measured according to ASTM DD 882 in both the machine direction (MD) and transverse direction (TD). 1% Secant Modulus is measured in both the machine direction (MD) and transverse direction (TD).

TABLE 2

Multi-layer film characteristics

| Characteristic | Target | Upper Limit | Lower Limit |
|---|---|---|---|
| Gauge (mils) | 2.5 | | |
| Yield (sq. inches/lb) | 10,511 | | |
| Basis Weight (pounds/3000 sq. ft) | 41.1 | | |
| MVTR | 0.550 | 0.450 | 0.650 |
| OTR | 7.5 | 6.5 | 8.5 |
| Haze (%) | 20 | 8 | 40 |
| Tensile MD (psi) | 7,100 | 6,000 | 8,000 |
| Tensile TD (psi) | 7,850 | 6,000 | 8,000 |
| Elongation MD (%) | 115 | 95 | 135 |
| Elongation TD (%) | 95 | 75 | 115 |
| 1% Secant Modulus MD (psi) | 149,100 | 130,000 | 160,000 |
| 1% Secant Modulus TD (psi) | 165,450 | 150,000 | 180,000 |

Example 3

Multi-Layer Film Test Results

The peel strength of a multi-layer film in accordance with an aspect of the present disclosure was measured. For this example, a multi-layer film in accordance with certain aspects of the present disclosure was heat sealed to a rigid PET container. Peel forces range from 1,500 grams/inch up to 3,000 grams/inch with a temperature range of 110° C. to 190° C.

Example 4

Formulation and Extrusion

An exemplary multi-layer film in accordance with certain aspects of the present disclosure is provided in the instant example. The multi-layer film in this example is a five sub-layer co-extruded film. For purposes of illustration, each sub-layer of the multi-layer film is numbered successively in reference to Table 3 of the present disclosure to correlate the sub-layer composition with the sub-layer thickness. The instant example is provided to evaluate the composition and thickness parameters of the exemplary multi-layer film.

A seal layer (2.1 of Table 3) comprises DSM Arnitel® EL250 thermoplastic elastomer. Ampacet 10090 was added as a slip agent and Polyfil ABC5000HC was added as an anti-block agent. The percentages by weight of the components were about:

| | |
|---|---|
| 58% | DSM Arnitel ® EL250 |
| 30% | Westlake Chemical EMAC ® SP2205 |
| 6% | Polyfil ABC5000HC |
| 6% | Ampacet 10090 |

The resins, slip agent, and anti-block were added to an extruder hopper and combined via blending to provide a formulation. The formulation was then heated in the extruder to form a molten material.

A second core sub-layer (2.2 of Table 3) comprises Westlake Chemical EMAC® SP2205. The percentages by weight of the components were about:
100% Westlake Chemical EMAC® SP2205

The resin was added to an extruder hopper to form a formulation. The formulation was heated in the extruder to form a molten material.

A first core sub-layer (2.3 of Table 3) comprises Exxon-Mobil™ LLDPE LL 3404.48 and Dow® DOWLEX™ 2035 as the LLDPE base resins. Polyfil ABC5000HC was added as an anti-block agent. The percentages by weight of the components were about:

| | |
|---|---|
| 79% | ExxonMobil ™ LLDPE LL 3404.48 |
| 20% | Dow ® DOWLEX ™ 2035 |
| 1% | Polyfil ABC5000HC |

The resins and antiblock were added to an extruder hopper and combined via blending to provide a formulation. The formulation was then heated in the extruder to form a molten material.

The molten materials described above were cast co-extruded to form a multi-layer film with a gauge of 2.0 mils, a density of 0.9579 g/cm³, and a thickness as described in Table 3.

A second skin sub-layer (2.4 of Table 3) comprises The Dow Chemical Company™ MOR-FREE™ L75-164 C/C-411 as a laminating adhesive that is applied to the core layer of the cast coextruded film.

A first skin sub-layer (2.5 of Table 3) comprises Toray Lumirror® PA10 film as the OPET material. The Toray Lumirror® PA10 can be laminated to the core layer to form a multi-layer film with a gauge of 2.5 mils, and a thickness as described in Table. 3

TABLE 3

Target Sub-layer Thicknesses

| Layer | Thickness (%) | Thickness (mil) |
|---|---|---|
| 2.1 | 16 | 0.4 |
| 2.2 | 16 | 0.4 |
| 2.3 | 48 | 1.2 |
| 2.4 | 0.8 | 0.02 |
| 2.5 | 19.2 | 0.48 |

The invention claimed is:

1. A package for use in high-pressure pasteurization comprising
a container comprising a polyester material, the container including a bowl formed to include an interior product-storage region therein and a brim coupled to the bowl and formed to include a mouth arranged to open into the interior product-storage region and
a closure coupled to the brim of the container to close selectively the mouth, the closure including a multi-layer film including a skin layer, a core layer coupled to the skin layer and located between the skin layer and the container, and a seal layer arranged to extend between and interconnect the core layer and the brim of the container,
wherein the multi-layer film comprises a thermoplastic elastomer and is configured to bond temporarily to the brim of the container and peel away from the brim after a pasteurization process to expose the mouth without leaving any portion of the multi-layer film behind coupled to the brim in response to a user applying a peel force to the multi-layer film,
wherein the seal layer comprises a copolyester thermoplastic elastomer and an ethylene acrylate copolymer,
wherein the core layer includes a first core sub-layer and a second core sub-layer, the first core sub-layer is arranged to extend between and interconnect the second core sub-layer and the skin layer, and
wherein the first core sub-layer comprises a first polyethylene material and a second polyethylene material, wherein the first polyethylene material is about 50 wt % to about 95 wt % of the first core sub-layer, and the second polyethylene material is about 5 wt % to about 40 wt % of the first core sub-layer, and
wherein the seal layer and the container form a hermetic seal that survives the pasteurization process.

2. The package of claim 1, wherein the second core sub-layer comprises an ethylene-acrylate copolymer.

3. The package of claim 1, wherein the skin layer includes a first skin sub-layer and a second skin sub-layer and the second skin sub-layer is arranged to extend between and interconnect the core layer and the first skin sub-layer, and wherein the first skin sub-layer comprises an OPET material.

4. The package of claim 1, wherein the polyester of the container is a PET material.

5. The package of claim 1, wherein the seal layer comprises about 30 wt % to about 95 wt % copolyester thermoplastic elastomer.

6. The package of claim 5, wherein the copolyester thermoplastic elastomer comprises a polyether soft segment.

7. The package of claim 1, wherein the ethylene acrylate copolymer is an ethylene methyl acrylate copolymer.

8. The package of claim 7, wherein the seal layer comprises about 10 wt % to about 40 wt % ethylene acrylate copolymer.

9. The package of claim 1, wherein the first polyethylene material comprises an ethylene-hexene copolymer.

10. The package of claim 9, wherein the second polyethylene material comprises an ethylene-octene copolymer.

11. A multi-layer film comprising
a skin layer,
a core layer comprising a polyethylene material, and
a seal layer comprising a copolyester thermoplastic elastomer material and an ethylene methyl acrylate copolymer and arranged to lie in spaced-apart relation to the skin layer to locate the core layer between the skin layer and the seal layer,
wherein the multi-layer film is configured to bond temporarily to a brim of a container to establish a hermetic seal that survives a pasteurization process and peels away from the brim after the pasteurization process to expose a mouth of the container without leaving any portion of the multi-layer film behind coupled to the brim when a user applies a peel force to the multi-layer film.

12. The multi-layer film of claim 11, wherein the seal layer comprises about 10% to about 40% ethylene methyl acrylate copolymer.

13. The multi-layer film of claim 11, wherein the copolyester thermoplastic elastomer material has a melt index of at least 25 g/10 min.

14. The multi-layer film of claim 11,
wherein the core layer comprises a first core sub-layer and a second core sub-layer, the first core sub-layer is arranged to extend between and interconnect the second core sub-layer and the skin layer,
the seal layer comprises about 50 wt % to about 90 wt % copolyester thermoplastic elastomer copolyester thermoplastic elastomer material and about 10% to about 40% ethylene methyl acrylate copolymer, and
the skin layer comprises a first skin sub-layer and a second skin sub-layer and the second skin sub-layer is arranged to extend between and interconnect the core layer and the first skin sub-layer.

15. The multi-layer film of claim 11, wherein the seal layer comprises about 30 wt % to about 95 wt % copolyester thermoplastic elastomer.

16. The multi-layer film of claim 15, wherein the copolyester thermoplastic elastomer comprises a polyether soft segment.

17. A package for use in high-pressure pasteurization, the package comprising
a container comprising a polyester material, the container including a bowl formed to include an interior product-storage region therein and a brim coupled to the bowl and formed to include a mouth arranged to open into the interior product-storage region and
a closure coupled to the brim of the container to close selectively the mouth, the closure including a multi-layer film including a skin layer, a core layer coupled to the skin layer and located between the skin layer and the container, and a seal layer arranged to extend between and interconnect the core layer and the brim of the container,
wherein the multi-layer film comprises a thermoplastic elastomer and is configured to bond temporarily to the brim of the container and peel away from the brim after a pasteurization process to expose the mouth without leaving any portion of the multi-layer film behind coupled to the brim in response to a user applying a peel force to the multi-layer film, and
wherein the seal layer comprises a copolyester thermoplastic elastomer and an ethylene acrylate copolymer,
wherein the seal layer and the container form a hermetic seal that survives the pasteurization process, and
wherein the peel force is about 1,500 /in to about 3,000 /in.

* * * * *